Patented Jan. 19, 1937

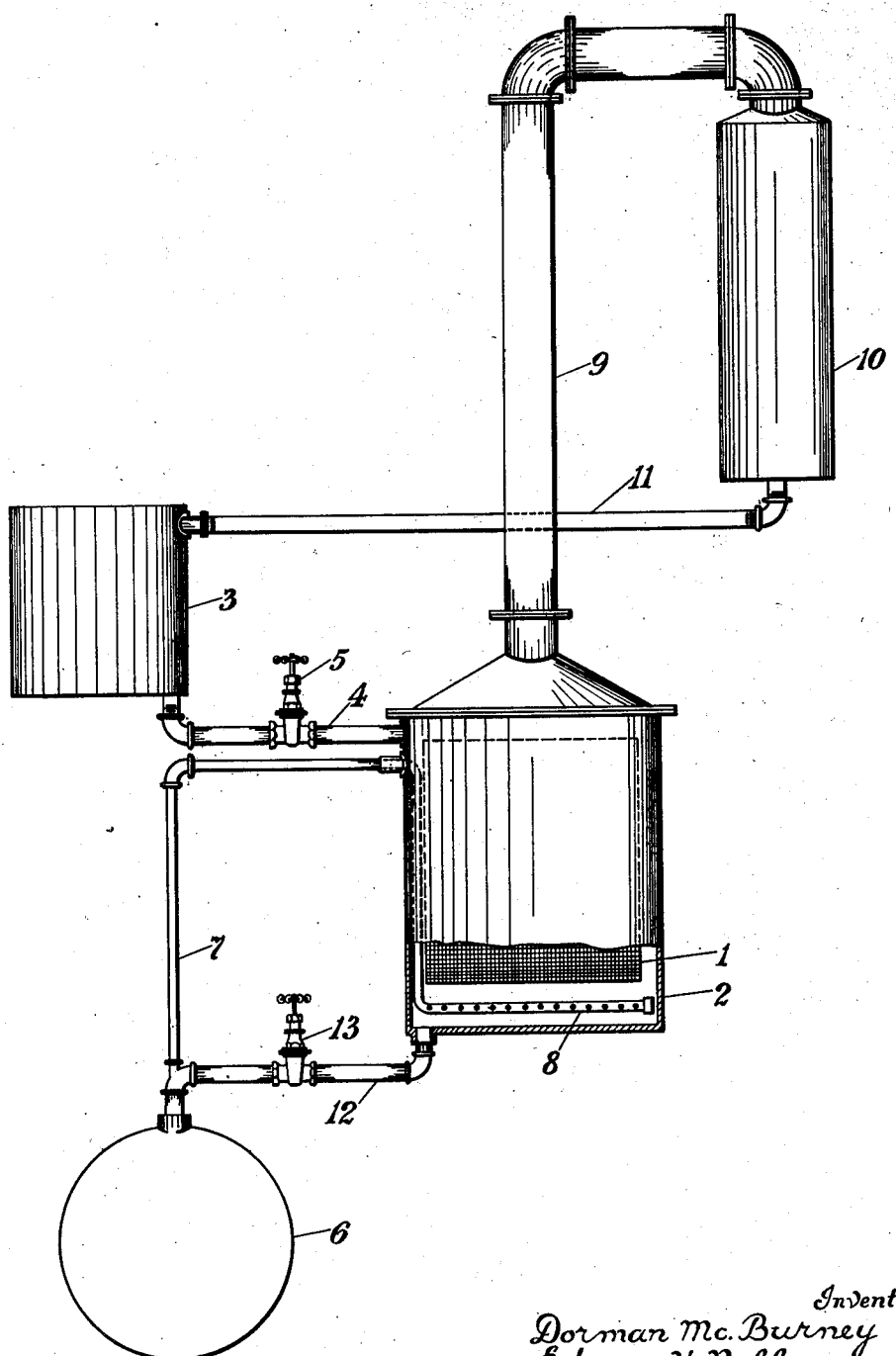

2,067,937

UNITED STATES PATENT OFFICE 2,067,937

TREATMENT OF CELLULOSE ESTERS CONTAINING COLLOIDING AGENTS

Dorman McBurney and Edgar H. Nollau, Newburgh, N. Y., assignors to E. I. du Pont de Nemours & Company, Wilmington, Del., a corporation of Delaware Application August 12, 1931, Serial No. 556,506

7 Claims. (Cl. 260—133)

This invention relates to a method of removing colloiding agents from cellulose esters, and more particularly, to a method of treating cellulose nitrate containing camphor to recover both the cellulose nitrate and camphor.

Scrap "Celluloid", French ivory, photographic film base, and the like, furnish a cheap and plentiful source of cellulose esters and of the various colloiding agents used in plasticizing cellulose esters. The use of such scrap without removal of the colloiding agents is frequently unsatisfactory and this is particularly true where camphor has been used as the colloiding agent, due to the characteristic odor of camphor which is objectionable in many of the articles made from cellulose esters. Heretofore, scrap film, and the like, have been treated for the removal of camphor, but many such processes result in the destruction of the cellulose ester, especially those involving treatment of the scrap with alkali and subsequent distillation of the camphor, thereby destroying the cellulose nitrate.

An object of the present invention is to provide a simple and economical process of removing colloiding agents from cellulose esters without harming either the colloiding agent or the ester. A more specific object is to provide a method of removing camphor from scrap cellulose nitrate containing camphor to obtain both the camphor and the camphor-free cellulose nitrate in satisfactory condition for reuse. Other objects will be apparent from the detailed description of the invention given hereinafter.

The above objects are accomplished according to the present invention by extracting the colloiding agent from the cellulose ester by means of an extraction medium, which is an active solvent for the colloiding agent but has merely a softening action on the cellulose ester in the presence of the colloiding agent, withdrawing the extraction medium containing the dissolved colloiding agent, and recovering the colloiding agent from the extraction medium.

The extraction medium may comprise a wide variety of solvents for the colloiding agents and may comprise a single solvent or a mixture of several solvents. The solvent selected must not have any substantial solvent effect on the cellulose ester being treated, but it is highly advantageous that it should have sufficient solvent action on the cellulose ester in the presence of the colloiding agent to cause a softening of the cellulose ester. This softening greatly facilitates the extraction of the colloiding agent. Ethylene dichloride, propylene dichloride, carbon tetrachloride, and chloroform are all suitable as single extraction mediums, or may be used in combination with ethyl alcohol. Ethyl alcohol is also a suitable extraction medium by itself and may be combined with benzol, toluene, water, acetone, or ethyl acetate to form a two-component solvent mixture, as well as with the chlorinated lower aliphatic hydrocarbons mentioned above. Where a two-component solvent mixture is being employed, in which one component is an active solvent for the cellulose ester being treated, for example, ethyl acetate or acetone, or where one component has no substantial solvent action on the colloiding agent to be extracted, for example, water, it will be apparent that the proportions of the components of the solvent mixture can be varied at will.

From the disclosure of the extraction mediums given above, other analogous solvents, either single or two or more component mixtures, will suggest themselves to those skilled in the art. A list of satisfactory two-component solvent mixtures suitable for use as the extracting medium is given below, showing the preferred proportion of each ingredient:

*Percentages by weight*

|  | Per cent |
|---|---|
| Benzol | 0–25 |
| Ethyl alcohol | 100–75 |
| | |
| Toluene | 0–25 |
| Ethyl alcohol | 100–75 |
| | |
| Ethylene dichloride | 100–95 |
| Ethyl alcohol | 0– 5 |
| | |
| Propylene dichloride | 100–95 |
| Ethyl alcohol | 0– 5 |
| | |
| Water | 0–10 |
| Ethyl alcohol | 100–90 |
| | |
| Acetone | 0– 0.5 |
| Ethyl alcohol | 100–99.5 |
| | |
| Ethyl acetate | 0– 0.5 |
| Ethyl alcohol | 100–99.5 |

In the single figure of the accompanying drawing is shown a front elevation of an apparatus suitable for carrying out the present invention, the apparatus being illustrated more or less diagrammatically.

A preferred method of carrying out the treatment of cellulose nitrate film scrap containing camphor as the colloiding agent is as follows: The film scrap is placed in the wire basket 1 of the extraction kettle 2. A suitable extraction medium, for example, ethylene dichloride, is run into the kettle 2 from the storage tank 3 through the pipe 4 by opening valve 5 until the film scrap has been covered. The still 6 containing a further supply of ethylene dichloride is then heated until the boiling point of ethylene dichloride is reached, the vapors of ethylene dichloride being conducted through the pipe 7 and sparger pipe 8 into the kettle 2. This vapor raises the temperature of the ethylene dichloride in the kettle 2 to, or near, the boiling point of ethylene dichloride, which is 83.5° C. The temperature varies between 74–83.5° C. The heating is continued for a period of from 5–60 minutes, usually about 15 minutes, and any ethylene dichloride vaporized passes through the pipe 9 to the condenser 10 and thus through pipe 11 back to the storage tank 3. The level of the ethylene dichloride in the kettle 2 is kept high enough to cover the film scrap by running additional amounts of ethylene dichloride into the kettle 2 from the storage tank 3 to replace ethylene dichloride lost through volatilization. After the heating period, the ethylene dichloride in kettle 2 is run back into the still 6 through pipe 12 by opening valve 13, and then removed to recover the camphor. The cellulose nitrate film scrap is left in the basket and subjected to a second extraction treatment, if desired. Three extraction treatments are sufficient in ordinary cases to remove the last trace of camphor from the cellulose nitrate, and even a single treatment may be sufficient in some cases.

The recovery of the camphor from the ethylene dichloride is conveniently accomplished by adding water to the solution of camphor in ethylene dichloride and distilling off the ethylene dichloride. The camphor is precipitated by this step, separated from the water by centrifuging, and sublimated to obtain a pure product. The recovery of the camphor from the ethylene dichloride solution may be carried out in other ways, as will be apparent to those skilled in the art. The specific method of recovering the colloiding agent from the extraction medium forms no part of the present invention.

After the ethylene dichloride has been withdrawn from the cellulose nitrate, the cellulose nitrate may be dissolved in suitable solvents and fillers and pigments, if present, filtered out, thereby obtaining a cellulose nitrate which has all the properties of the so-called "virgin" cellulose nitrate.

The proportion of extraction medium to cellulose ester to be treated may vary widely, but it has been found preferable to use from 1–15 parts by weight of extraction medium to one part by weight of cellulose ester.

The following example is given to illustrate a typical extraction of camphor from cellulose nitrate film scrap.

Example 1.—First cycle: 49.5 pounds of film scrap were placed in the extraction basket and extracted for 25 minutes with 675 pounds of ethylene dichloride. The extraction medium was withdrawn after this period.

Second cycle: The film scrap was then extracted for 20 minutes with 525 pounds of fresh ethylene dichloride, the extracting medium being again withdrawn after this period.

Third cycle: The film scrap was again extracted for 20 minutes with 525 pounds of fresh ethylene dichloride, the extraction medium being withdrawn after this period, and leaving a substantially camphor-free cellulose nitrate in the extraction kettle.

The approximate temperature at which the extraction steps were carried out was 74° C. The camphor was recovered from the ethylene dichloride used in the process and the extracted cellulose nitrate was dissolved and applied to a surface as a coating to see if any trace of the characteristic odor of camphor remained. It was found that the cellulose nitrate did not have the slightest trace of the characteristic camphor odor.

The process of the present invention is applicable to cellulose acetate and other esters of cellulose, due consideration being taken of the particular ester under treatment, in order than an extraction medium is selected having substantially no solvent effect other than a mere softening action on the ester.

An advantage of the present invention is the recovery of the cellulose ester having essentially the properties substantially identical with so-called "virgin" cellulose esters, that is, cellulose ester which has not been used. The colloiding agent can be removed substantially quantitatively and recovered in pure form. The process is economical to carry out and adapted for large scale operation. Where the claims mention camphor as the colloiding agent, it is to be understood that they include obvious equivalents thereof which are soluble without chemical change in the solvent recited.

While a particular preferred method of carrying out the invention has been described with the use of ethylene dichloride as the extraction medium, it is not intended that the invention be limited to the use of ethylene dichloride as the single extraction mediums, and the two-component extraction mediums disclosed herein are all suitable for this purpose, as well as various other single and two-component extraction mediums which will be apparent to those skilled in the art from a consideration of the solvents herein disclosed.

As many apparent and widely different embodiments of this invention may be made without departing from the spirit and scope thereof, it is to be understood that we do not limit ourselves to the specific embodiments thereof except as defined in the appended claims.

We claim:

1. In a process of purifying cellulose ester compositions containing camphor, the improvement which comprises treating the camphor-containing cellulose ester composition with a dichlorinated saturated lower aliphatic hydrocarbon in such excess that the cellulose ester is not dissolved.

2. In a process of purifying cellulose nitrate compositions containing camphor, the improvement which comprises treating the camphor-containing cellulose nitrate composition with a dichlorinated saturated lower aliphatic hydrocarbon in such excess that the cellulose nitrate is not dissolved.

3. In a process of purifying cellulose nitrate containing camphor, the improvement which comprises extracting the camphor from the cellulose nitrate by treating the camphor-containing cellulose nitrate with ethylene dichloride in such excess that the cellulose nitrate is not dissolved, withdrawing the extraction medium from the cellulose nitrate, and recovering the camphor from the extraction medium.

4. Method of treating cellulose nitrate containing camphor which comprises extracting the camphor from the cellulose nitrate by means of ethylene dichloride in such excess that the cellulose nitrate is not dissolved at approximately the boiling point of ethylene dichloride, withdrawing the ethylene dichloride, and recovering the camphor from the ethylene dichloride.

5. Method of treating cellulose nitrate containing camphor which comprises extracting the camphor from the cellulose nitrate by immersing the cellulose nitrate in a liquid ethylene dichloride bath containing such an excess of ethylene dichloride that the cellulose nitrate is not dissolved and passing the ethylene dichloride vapors through the bath for 5-60 minutes, withdrawing the ethylene dichloride from the cellulose nitrate, and recovering the camphor from the ethylene dichloride.

6. Method of treating cellulose nitrate containing camphor which comprises extracting the camphor from the cellulose nitrate by means of propylene dichloride in such excess that the cellulose nitrate is not dissolved at approximately the boiling point of propylene dichloride, withdrawing the propylene dichloride, and recovering the camphor therefrom.

7. Process of recovering camphor and cellulose ester from celluloid scrap which comprises extracting the scrap with at least ten times its weight of ethylene dichloride for about 25 minutes, withdrawing the same, and treating the scrap with a similar amount of the dichloride for a shorter period of time, and repeating until the ester is substantially free of camphor.

DORMAN McBURNEY.
EDGAR H. NOLLAU.